United States Patent
Xu et al.

(10) Patent No.: US 10,187,816 B2
(45) Date of Patent: Jan. 22, 2019

(54) WIRELESS COMMUNICATION SYSTEM, FOR REPORTING RADIO LINK INFORMATION OF A FIRST RADIO LINK VIA A SECOND RADIO LINK WHEN RADIO LINK PROBLEM HAS OCCURRED IN THE FIRST RADIO LINK

(71) Applicant: SONY CORPORATION, Tokyo (JP)

(72) Inventors: Xiaodong Xu, Beijing (CN); Yateng Hong, Beijing (CN); Ya Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/860,368

(22) Filed: Jan. 2, 2018

(65) Prior Publication Data

US 2018/0124619 A1     May 3, 2018

Related U.S. Application Data

(63) Continuation of application No. 15/108,665, filed as application No. PCT/CN2015/071295 on Jan. 22, 2015, now Pat. No. 9,913,156.

(30) Foreign Application Priority Data

Jan. 24, 2014     (CN) .......................... 2014 1 0035684

(51) Int. Cl.
*H04W 24/00*     (2009.01)
*H04W 24/08*     (2009.01)
(Continued)

(52) U.S. Cl.
CPC ............ *H04W 24/08* (2013.01); *H04W 24/02* (2013.01); *H04W 24/10* (2013.01); *H04W 76/19* (2018.02); *H04W 76/28* (2018.02); *H04W 76/38* (2018.02)

(58) Field of Classification Search
None
See application file for complete search history.

(56) References Cited

U.S. PATENT DOCUMENTS

| 2009/0046573 A1* | 2/2009 | Damnjanovic | ...... H04J 11/0093 370/216 |
| 2010/0113008 A1 | 5/2010 | Wang | |

(Continued)

FOREIGN PATENT DOCUMENTS

| CN | 102958116 A | 3/2013 |
| CN | 103491570 A | 1/2014 |

(Continued)

OTHER PUBLICATIONS

"RLM considerations for dual connectivity", CATT, CATR, 3GPP TSG RAN WG2 Meeting #84, R2-134053, Nov. 2013, 5 pages.

(Continued)

*Primary Examiner* — Idowu O Osifade
(74) *Attorney, Agent, or Firm* — XSENSUS LLP

(57) ABSTRACT

A user equipment device including circuitry that establishes a first radio link and a second radio link, the first radio link being between the user equipment and a first node, and the second radio link being between the user equipment and a second node, so that the user equipment is simultaneously communicatively connected with the first node and the second node using the first radio link and the second radio link respectively; determines whether a radio link problem has occurred in the first radio link; starts a first timer the radio link problem has occurred in the first radio link when the first timer expires; and reports, when the radio link problem has occurred, content comprising radio link information of the first radio link including radio link failure type to the second node via the second radio link.

25 Claims, 9 Drawing Sheets

(51) Int. Cl.
*H04W 24/02* (2009.01)
*H04W 24/10* (2009.01)
*H04W 76/19* (2018.01)
*H04W 76/28* (2018.01)
*H04W 76/38* (2018.01)

(56) References Cited

U.S. PATENT DOCUMENTS

| | | |
|---|---|---|
| 2014/0038616 A1 | 2/2014 | Burbidge |
| 2014/0171083 A1 | 6/2014 | Zhang et al. |
| 2016/0014646 A1* | 1/2016 | Yiu .................. H04W 24/04 370/331 |
| 2016/0021696 A1 | 1/2016 | Chuang |

FOREIGN PATENT DOCUMENTS

| | | |
|---|---|---|
| WO | WO 2010/105148 A1 | 9/2010 |
| WO | 2013/111889 A1 | 8/2013 |

OTHER PUBLICATIONS

"Mobility robustness with dual connectivity", Broadcom Corporation, 3GPP TSG-RAN WG2 Meeting #83-BIS, R2-133531, Oct. 2013, 6 pages.

International Search Report dated Apr. 22, 2015 in PCT/CN2015/071295 filed Jan. 22, 2015.

"Radio link failure handling for dual connectivity", Intel Corporation, 3GPP TSG RAN WG2 Meeting #82, R2-131990, 7.2.2.2, May 2013, 4 pages.

"RLF issues in inter-eNB CA", Kyocera, 3GPP TSG-RAN WG2 #84, R2-134317, 7.2.3, Nov. 2013, 3 pages.

\* cited by examiner

WIRELESS COMMUNICATION SYSTEM, FOR REPORTING RADIO LINK INFORMATION OF A FIRST RADIO LINK VIA A SECOND RADIO LINK WHEN RADIO LINK PROBLEM HAS OCCURRED IN THE FIRST RADIO LINK

This application is a continuation of U.S. application Ser. No. 15/108,665 filed Jun. 28, 2016, which is based on PCT/CN2015/071295 file Jan. 22, 2015 and claims the benefit of priority under 35 U.S.C. § 119 from Chinese Patent Application No. 201410035684.9 filed Jan. 24, 2014. Each of the aforementioned applications is herein incorporated by reference in their entirety.

FIELD

The present disclosure relates to the field of wireless communication technology, and more particularly, to a device on user equipment side in a wireless communication system, a device, a method for use in the wireless communication system and a wireless communication system, which are capable of quickly solving a radio link problem.

BACKGROUND

When a signal of user equipment has been subjected to severe interference or deep attenuation, the user equipment may undergo a radio link failure. The radio link failure will result in interruption of service transmission, during which the user equipment can not transmit or receive any data service. Further, a too long time of interruption of connection will produce a negative effect on an application layer, thereby lowering user experience.

In order to account for amount of mobile data which increases exponentially in a network, small cells are deployed in hot regions in a heterogeneous network. Standardization work of 3GPP LTE Release 12 mainly focuses on small cell enhancement (SCE). As compared with the traditional heterogeneous network, a larger number of small cells will be deployed in a small cell network (SCN). SCN is not a coverage-limited network, but the user equipment in the small cells will subject to severe interference from neighboring nodes due to the dense deployment of the small cells, and thus the radio link failure will occur more easily. Therefore, in order to provide stable service for users, a solution which quickly solves the radio link problem for SCN is required.

Existing quick solutions with respect to the radio link problem in the heterogeneous network mainly include two directions: (1) a time length of a T310 timer is reduced to reduce service interruption time of the user equipment, in which the T310 timer is defined as being triggered when the user equipment deems the radio link problem has been detected and as being expired when the user equipment declares the radio link failure; and (2) radio resource control (RRC) connection is re-established according to user equipment context by a network end. Regarding solution (1), it may directly reduce an overall service interruption time, but might cause the user equipment to declare the radio link failure too early, that is, might make the user equipment lose an opportunity to wait for recovering of a radio link in which a problem has occurred, which may possibly increase the service interruption time to some extent. As for solution (2), it can improve probability of succeeding in reestablishment of RRC connection, but needs additional signaling overhead for transmitting new user equipment context when the user equipment context saved in a source cell has changed, the signaling overhead being in proportional to number of potential target cells for which the RRC connection is reestablished, and thus it might introduce additional time delay.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above circumstances, an object of the present disclosure is to provide a solution which is capable of quickly solving the radio link problem in the heterogeneous network, thereby improving robustness in mobility.

In a future network, deployment of the small cells in a hot district becomes much denser and inter-cell interference becomes much severer. Meanwhile, the user equipment might easily subject to the radio link failure in a scene of a heterogeneous network with dense deployment due to limited coverage ranges of the small cells. "Dual-connection" is one of important contents in standardization of 3GPP LTE Release-12, and the user equipment may simultaneously establish independent connections with two different base stations in a scene of the dual-connection. Therefore, an architecture of dual-connection would facilitate the user equipment to quickly recover from such radio link failure, that is, to perform reconnection with a base station of an original serving cell, perform handover to a base station of another cell, or release connection with the base station of the original serving cell thereby changing to a single connection from the dual-connection.

An important concept in design of the dual-connection is separation of control plane/user plane, and the user equipment may for example simultaneously maintain connections with a macro base station and a small base station through the dual-connection. The macro base station and the small base station usually differ in transmission power and deployment scene, for example, the macro base station has a larger transmission power and usually provides larger coverage, while the small base station has a significantly lower transmission power and usually provides coverage only for one hot district. However, since a physical distance between the user equipment and the small base station is relatively small, the user equipment may much easily obtain a better channel quality. Therefore, in the architecture of dual-connection, the macro base station usually takes charge of the control plane, for example, carrying of control signaling, provides more stable and flexible mobility control, and thus is referred to as an anchor node; while the small base station is more suitable for providing data access of a large bandwidth and a high rate in the hot district, mainly takes charge of the user plane, and thus is referred to as a booster node. Meanwhile, in the scene of dual-connection, the anchor node and the booster node are usually separated from each other spatially, and thus wireless connections between the two nodes and the user equipment are usually independent and irrelevant from each other. Therefore, it is possible to utilize diversity gain to provide better robustness in mobility for the user equipment in the scene of dual-connection.

It should be noted here an application example in which the macro base station takes charges of the control plane and the small base station takes charge of the user plane has been given in order to facilitate description and understanding, and the invention is not limited thereto. With the development of the mobile communication technology, both of the two base stations connected with the user equipment might be small base stations, one taking charge of the control plane and the other one taking charge of the user plane. Further, in the disclosure, the control signaling and data might not be necessarily transmitted by different nodes separately, and it is possible that one node takes charge of the transmission of both the control signaling and the data.

Further, it should also be noted that although in prior art, general definition of the "dual-connection" is that both of the two nodes connected with the user equipment in the dual-connection are base stations, it should understand that the meaning of the "dual-connection" in the disclosure is not limited thereto. That is, the two nodes connected with the user equipment are not limited to two base stations, but may be other network nodes (e.g., user equipment, a relay node or the like) in Device to Device (D2D) or LTE-Wifi interconnection scenes. As long as the user equipment may establish two or more independent radio links with these nodes, independence among the radio links might be used to solve the radio link problem. That is to say, the invention may be readily extended to be applied to other scenes.

According to the disclosure, in the dual-connection scene, if channel quality of a link between the user equipment and a node is relatively poor (the radio link problem has been detected) while channel quality of a link between the user equipment and other node is normal, the link with normal channel quality can be utilized to assist the user equipment in quickly solving the radio link problem, thereby reducing the service interruption time for the user equipment and enhancing robustness in mobility of the user equipment in this scene.

According to an aspect of the disclosure, there is provided a device on user equipment side in a wireless communication system, the device including: a radio link problem detecting unit configured to detect a first radio link between a first node and user equipment to determine whether a radio link problem has occurred; a timer configuring unit configured to start a first timer when it has been detected that the radio link problem has occurred in the first radio link, in which when the first timer expires, the user equipment considers it has been detected that a radio link failure event has occurred in the first radio link; and a radio link information reporting unit configured to report, when it has been detected that the radio link problem has occurred in the first radio link, content containing radio link information of the first radio link to a second node via a second radio link between the user equipment and the second node.

According to another aspect of the disclosure, there is also provided a device in a wireless communication system, the device including: a radio link information receiving unit configured to receive, when a radio link problem occurs in a first radio link between user equipment and other node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing unit configured to instruct, according to the received report, the user equipment or the other node to perform corresponding operations to solve the radio link problem.

According to another aspect of the disclosure, there is also provided a device in a wireless communication system, the device including: a receiving unit configured to receive, when a radio link problem occurs in a first radio link between a node corresponding to the device and user equipment, a warning about the radio link problem from other node, so that the device takes corresponding measures to solve the radio link problem according to the warning.

According to another aspect of the disclosure, there is also provided a method for use in a wireless communication system, the method including: a radio link problem detecting step of detecting a first radio link between a first node and user equipment so as to determine whether a radio link problem has occurred; a timer configuring step of starting a first timer when it is detected that the radio link problem has occurred in the first radio link, in which when the first timer expires, the user equipment considers it has been detected that a radio link failure event has occurred in the first radio link; and a radio link information reporting step of reporting, when it has been detected that the radio link problem has occurred in the first radio link, content containing radio link information of the first radio link to a second node via a second radio link between the user equipment and the second node.

According to another aspect of the disclosure, there is also provided a method for use in a wireless communication system, the method including: a radio link information receiving step of receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing step of instructing, according to the received report, the user equipment or the first node to perform corresponding operations to solve the radio link problem.

According to another aspect of the disclosure, there is also provided a method for use in a wireless communication system, the method including: a receiving step of receiving, when a radio link problem occurs in a first radio link between a first node and user equipment, a warning about the radio link problem from a second node, so that the first node takes corresponding measures to solve the radio link problem according to the warning.

According to another aspect of the disclosure, there is also provided a wireless communication system including: user equipment; a first node; and a second node, in which when a radio link problem occurs in a first radio link between the user equipment and the first node, the user equipment reports content containing radio link information of the first radio link to the second node via a second radio link between the user equipment and the second node, so that the second node instructs the user equipment or the first node to perform corresponding operations to solve the radio link problem.

According to another aspect of the disclosure, there is also provided a storage medium including machine readable program codes which, when executed on an information processing apparatus, cause the information processing apparatus to perform the following steps: a radio link problem detecting step of detecting a first radio link between a first node and user equipment so as to determine whether a radio link problem has occurred; a timer configuring step of starting a first timer when it is detected that the radio link problem has occurred in the first radio link, in which when the first timer expires, the user equipment considers it has been detected that a radio link failure event has occurred in the first radio link; and a radio link information reporting step of reporting, when it has been detected that the radio link problem has occurred in the first radio link, content containing radio link information of the first radio link to a second node via a second radio link between the user equipment and the second node.

According to another aspect of the disclosure, there is also provided a program product including machine executable instructions which, when executed on an information processing apparatus, cause the information processing apparatus to perform the following steps: a radio link problem detecting step of detecting a first radio link between a first node and user equipment so as to determine whether a radio link problem has occurred; a timer configuring step of starting a first timer when it is detected that the radio link problem has occurred in the first radio link, in which when the first timer expires, the user equipment considers it has been detected that a radio link failure event has occurred in the first radio link; and a radio link information reporting step of reporting, when it has been detected that the radio link problem has occurred in the first radio link, content containing radio link information of the first radio link to a second node via a second radio link between the user equipment and the second node.

According to another aspect of the disclosure, there is also provided a storage medium including machine readable program codes which, when executed on an information processing apparatus, cause the information processing apparatus to perform the following steps: a radio link information receiving step of receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing step of instructing, according to the received report, the user equipment or the first node to perform corresponding operations to solve the radio link problem.

According to another aspect of the disclosure, there is also provided a program product including machine executable instructions which, when executed on an information processing apparatus, cause the information processing apparatus to perform the following steps: a radio link information receiving step of receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing step of instructing, according to the received report, the user equipment or the first node to perform corresponding operations to solve the radio link problem.

According to another aspect of the disclosure, there is also provided a storage medium including machine readable program codes which, when executed on an information processing apparatus, cause the information processing apparatus to perform the following step: a receiving step of receiving, when a radio link problem occurs in a first radio link between a first node and user equipment, a warning about the radio link problem from a second node, so that the first node takes corresponding measures to solve the radio link problem according to the warning.

According to another aspect of the disclosure, there is also provided a program product including machine executable instructions which, when executed on an information processing apparatus, cause the information processing apparatus to perform the following step: a receiving step of receiving, when a radio link problem occurs in a first radio link between a first node and user equipment, a warning about the radio link problem from a second node, so that the first node takes corresponding measures to solve the radio link problem according to the warning.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION

Figure 1:
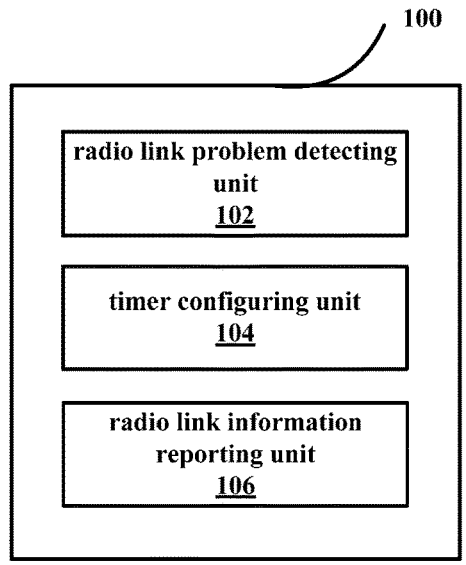
FIG. 1 is a block diagram illustrating an example of functional configuration of a device on user equipment side in a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Embodiments of the disclosure will be described below with reference to FIGS. 1-16. First, an example of functional configuration of a device on user equipment side in a wireless communication system according to an embodiment of the disclosure will be described with reference to FIG. 1. FIG. 1 is a block diagram illustrating an example of functional configuration of a device on user equipment side in a wireless communication system according to an embodiment of the disclosure.

As shown in FIG. 1, a device 100 on user equipment side may include a radio link problem detecting unit 102, a timer configuring unit 104 and a radio link information reporting unit 106. An example of functional configuration of each of the units will be described in detail below.

The radio link problem detecting unit 102 may be configured to detect a first radio link between a first node and user equipment to determine whether a radio link problem has occurred.

Specifically, for example, the radio link problem detecting unit 102 may obtain a current block error rate of a control channel by measuring a Signal to Interference plus Noise Ratio (SINR) of a downlink public pilot signal (CRS) and performing mapping, and compare the block error rate with a predefined threshold, and if the current block error rate is higher than the threshold, then it is considered that a problem has occurred in the current radio link. It should understand that such manner is only an example but not limitation, and those skilled in the art may detect whether a problem has occurred in the radio link in any other manners which are well-known in the art.

The timer configuring unit 104 may be configured to start a first timer when it has been detected that the radio link problem has occurred in the first radio link, and when the first timer expires, the user equipment considers it has been detected that a radio link failure (RLF) event has occurred in the first radio link. It should understand that the first timer herein corresponds to for example the above T310 timer.

The radio link information reporting unit 106 may be configured to report, when it has been detected that the radio link problem has occurred in the first radio link, content containing radio link information of the first radio link to a second node via a second radio link between the user equipment and the second node. In this way, the second node may notify the radio link problem to the first node via an X2 interface, and thus the first node may timely prepare related context of the user equipment to be provided to possible handover target nodes or adopt other measures to assist the user equipment in solving the radio link problem, thereby reducing the service interruption time.

Preferably, at least one of the first node and the second node described above may be a base station.

Preferably, the content reported to the second node may include information related to a second timer of the user equipment. Particularly, when there is a cell satisfying a predetermined measurement reporting event, the user equipment starts the second timer for each satisfied measurement reporting event, and performs corresponding measurement reporting when the second timer expires. The measurement reporting event herein includes for example at least one of five in-system measurement reporting events A1 to A5 as defined in LTE Release 8 and a measurement reporting event A6 and events B1 and B2 which are added in LTE Release 10 with respect to a scene of carrier aggregation (refer to definitions regarding events A1 to A6 and events B1 and B2 in TS 36.331). Further, the second timer herein may be for example a so-called Time To Trigger (TTT) timer, during which the defined measurement reporting events are always satisfied and the user equipment will report the measurement result.

Specifically, the information related to the second timer may include a state of the second timer and information of a corresponding cell, the state of the second timer including at least one of being running and having expired. The information of the cell may include for example an ID of the cell corresponding to the second timer. Further, preferably, the information related to the second timer may also include information of the corresponding measurement reporting event, such as a type of the measurement reporting event or the like. The first/second node may know current potential cells to which the handover can be performed by combining with this information, and may assist the user equipment in quickly solving the radio link problem by combining with network deployment information, load information or the like.

It should understand that the information related to the second timer may also only include state information of the second timer (for example, being running or having expired) and number of the second timers in corresponding different states. In this case, when there is a second timer being running or having expired, the first/second node may judge that the user equipment might be located on the edge of the cell, and thus the timer configuring unit 104 may configure a shorter time length of the first timer. On the other hand, if there is no second timer being running or having expired, this means there is no cell satisfying the measurement reporting event currently, that is, this indicates the current radio link problem is only temporary and the user equipment may recover from this problem later, and thus there is no need to report such case to the second node.

Preferably, when it has been detected that the radio link problem has occurred in the first radio link, the timer configuring unit 104 may further start a third timer simultaneously, and the radio link information reporting unit 106 reports the content to the second node when the third timer expires, a time length of the third timer being shorter than a time length of the first timer, that is to say, the third timer is started simultaneously with the first timer but expires prior to the first timer. Thus, since the link information is reported only when the third timer expires and thus there is no need to frequently report the radio link information to the node when the link fluctuates, it is possible to avoid too much service overhead and signaling load. Further, the current radio link problem and related assistance information are reported to the second node when the third timer expires (before the first timer expires), and thus the second node may perform corresponding control on behaviors of the user equipment according to the reported information, for example, setting of the first timer (maintaining or immediately pausing) and establishing/releasing of the dual-connection or the like.

Preferably, when the third timer expires, the timer configuring unit 104 may reset the third timer and re-trigger the reset third timer, and the above content is reported to the second node after the third timer expires, until the first timer expires or is paused. Thus, it is possible to avoid a case in which the radio link problem can't be reported when the second timer is triggered after the third timer expires.

Further, preferably, the radio link information reporting unit 106 may further choose candidate cells having the same cell types as the first node from all of cells corresponding to the second timers, and report information related to the second timers corresponding to the candidate cells to the second node, the cell types comprising a macro cell and a small cell. For example, if the cell type of the first node is the macro cell, the chosen candidate cells should only be macro cells, on the other hand, if the cell type of the first node is the small cell, the chosen candidate cells should only be small cells. As an example, the radio link information reporting unit 106 may for example judge the cell type according to a signal reception power or the like, and the invention makes no limitation on this. Further, alternatively, such choosing processing may also be performed on the base station side rather than being performed on the user equipment side, and thus such processing of the radio link information reporting unit 106 is optional and the user equipment may receive from the base station side information regarding the cell type.

It should understand that if the chosen cell is none, it indicates that there is no target cell to which the handover can be performed, and thus the first timer is maintained and the user equipment reconnects with the first node after the first timer expires. It should be noted here that if the choosing processing is performed on the base station side, as described above, the base station side decides to maintain the first timer if the chosen result is none. On the other hand, if the choosing processing is performed on the user equipment side, the user equipment may select not to report thereby maintaining the first timer if the chosen result is none.

Preferably, the radio link information reporting unit 106 further judges whether the number of the candidate cells is larger than a predetermined threshold, and does not report the content including the information related to the timers of the user equipment as described above to the second node if it is judged that the number of the candidate cells is larger than the predetermined threshold. It should understand that if the number of the candidate cells is larger than the predetermined threshold, it indicates that there are multiple cells satisfying a condition of entering the handover event and the user equipment is currently located on an edge of small cells with dense deployment. In this case, there might exist no cell with a signal strength being significantly better than other cells and the interference condition is relatively severe, and thus even if the user equipment switches the wireless connection with the first node to other cells at this time, the radio link problem might occur again due to too great interference, insufficient signal strength or the like. Therefore, in this case, since there is no need to perform inter-cell handover, it is possible not to report the above content to the second node.

As described above, the information related to the radio link problem of the first radio link is transmitted to the second node by means of the second radio link in good condition, and the second node may notify related conditions to the first node via the X2 interface for example, and thus the first node may prepare context of the user equipment in advance to be provided to potential handover target cells. In this way, it is possible to reduce the service interruption time of the user equipment, thereby obtaining better user experience. Further, by setting the third timer for reporting radio link problem related information to the second node, it is possible to configure the first timer (e.g., the T310 timer) more reasonably, thereby further facilitating reduction in service interruption time of the user equipment.

Figure 2:
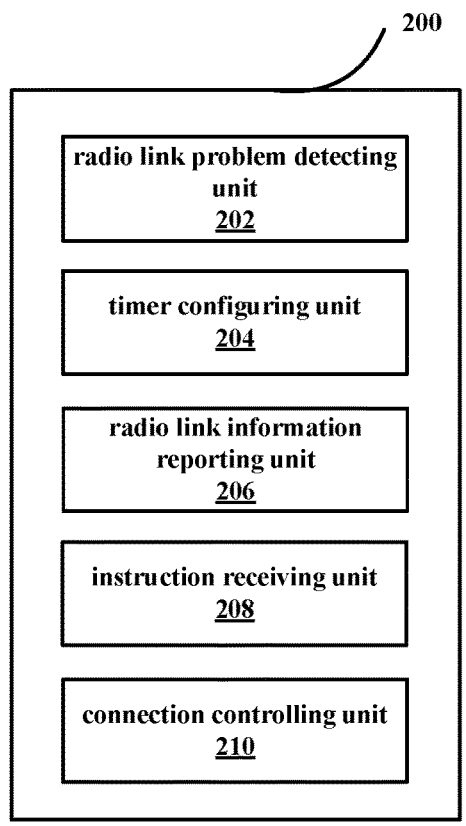
FIG. 2 is a block diagram illustrating an example of functional configuration of a device on user equipment side in a wireless communication system according to another embodiment of the disclosure.

Alternatively, it is also possible to cause, according to an instruction regarding the first radio link received from the second node, the user equipment to perform corresponding operations to solve the radio link problem, thereby reducing the service interruption time of the user equipment. Hereinafter, an example of functional configuration of a device on user equipment side in a wireless communication system according to another embodiment of the disclosure in this case will be described with reference to FIG. 2. FIG. 2 is a block diagram illustrating an example of functional configuration of a device on user equipment side in a wireless communication system according to another embodiment of the disclosure.

As shown in FIG. 2, a device 200 on user equipment side may include a radio link problem detecting unit 202, a timer configuring unit 204, a radio link information reporting unit 206, an instruction receiving unit 208 and a connection controlling unit 210. Particularly, functional configurations of the radio link problem detecting unit 202, the timer configuring unit 204 and the radio link information reporting unit 206 are the same as those of the radio link problem detecting unit 102, the timer configuring unit 104 and the radio link information reporting unit 106 described above with reference to FIG. 1, and thus no repeated description thereof will be made herein. Only examples of functional configurations of the instruction receiving unit 208 and the connection controlling unit 210 will be described in detail below.

The instruction receiving unit 208 may be configured to receive from the second node an instruction regarding the first radio link. Specifically, in a case that the second node is the base station, the instruction may be an instruction made by the second node according to the radio link information of the first radio link, while in a case that the second node is the user equipment for example, the instruction may be an instruction forwarded via the second node.

The connection controlling unit 210 may be configured to cause, according to the instruction received by the instruction receiving unit 208, the user equipment to perform corresponding operations to solve the radio link problem.

Preferably, the received instruction may include availability information of cells corresponding to the second timers and control information for the first timer, and the timer configuring unit 204 may be configured to perform processing of pausing or maintaining running of the first timer according to the control information for the first timer.

Specifically, if there is an available target cell among the cells corresponding to the second timers, the control information for the first timer is to pause the running of the first timer, and if there is no available target cell, the number of the cells corresponding to the second timers exceeds a predetermined number or the chosen cell is none, the control information for the first timer is to maintain the first timer.

Preferably, the availability information of the cells corresponding to the second timers may include information indicating which cells have context information between the user equipment and the first node, and the connection controlling unit 210 may cause, according to the availability information of the cells corresponding to the second timers, the user equipment to release connection with the first node and attempt to establish connection with an available target cell among the cells corresponding to the second timers, or to release the connection with the first node and cause service carried by the first radio link to be transferred to the second radio link so that the dual-connection is changed to single connection, after the first timer is paused.

Specifically, if there is available target cell among the cells corresponding to the second timers, the timer configuring unit 204 may immediately pause the running of the first timer when the second timer corresponding to the available target cell expires, and the connection controlling unit 210 may release the connection between the user equipment and the first node and synchronize with the available target cell.

Further, preferably, when the first radio link mainly carries control signaling transmission, that is, when the first node is the anchor node (usually being the macro cell) taking charge of the control plane, the connection controlling unit 210 causes, before causing the user equipment to release the connection with the first node and attempt to establish connection with the target cell, the user equipment to establish a connection on the control plane with the second node so that the second radio link mainly carries the control signaling transmission, thereby making the second node become the anchor node at this time and completing changeover of the anchor node/booster node. After the changeover is completed, the user equipment synchronizes with the target cell to establish connection with the booster node, and if the radio link between the user equipment and the target cell is relatively stable in a predetermined time thereafter, the changeover of the anchor node/booster node may be performed again, that is, making the node of the target cell become the anchor node and the second node become the booster node, thereby ensuring the type of the anchor node is the macro cell.

On the other hand, if there is no available target cell, the timer configuring unit 204 may maintain the first timer, and the connection controlling unit 210 may release the connection with the first node when the first timer expires, so that the service carried by the first radio link is transferred to the second radio link and the dual-connection changes to the single connection. In an alternative example, if there is no available target cell, the timer configuring unit 204 may maintain the first timer, and the connection controlling unit 210 may perform a reconnection procedure similar to that in prior art when the first timer expires.

Further, preferably, when the control information for the first timer indicates maintaining running of the first timer, the instruction made by the second node may further include a reason why the running is maintained or an instruction to perform reconnection or to release connection after the first timer expires.

Specifically, as described above, if the reason why the running is maintained is the number of the chosen cell is zero, the instruction is to perform reconnection with the first node after the first timer expires; and if the reason why the running is maintained is the number of the cells corresponding to the second timers is too large or all the cells corresponding to the second timers are not available, the instruction is to release the connection with the first node after the timer expires.

When the first timer expires, the connection controlling unit 210 may cause, according to the instruction received from the second node, the user equipment to perform reconnection with the first node or to release the connection with the first node, and in a case of releasing the connection with the first node, the connection controlling unit 210 causes the service carried by the first radio link to be transferred to the second radio link so that the dual-connection of the user equipment changes to the single connection.

It should be noted here that according to the disclosure, the operation of reestablishing connection may be started immediately after the first timer (e.g., the T310 timer) expires, while in prior art, it needs to wait for starting this operation until another timer (i.e., T311 timer) expires, therefore, the disclosure further reduces the service interruption time of the user equipment as compared with the prior art.

Further, it should understand that although it has been described above the third timer is further started to report the radio link problem to the second node, and thus the first timer is controlled according to conditions when the third timer expires, the disclosure may not set the third timer. In this case, the timer configuring unit 204 may adjust the time length of the first timer according to the instruction received by the instruction receiving unit 208.

Specifically, if the current radio link problem is judged as temporary, the second node may instruct to appropriately lengthen the time length of the first timer to wait for recovering of the first radio link. On the other hand, if it is judged there is the second timer of the corresponding measurement reporting event when the current radio link problem occurs, it indicates the condition of the first radio link is relatively poor, and the second node may instruct to configure a shorter time length for the first timer. For example, if the second node finds there is no running or expired second timer according to the content reported by the user equipment, it may be inferred that the user equipment has not arrived at the cell edge of the first node, and thus at this time, the second node may instruct to set a longer first timer to give more time to wait for recovering of the first radio link, and the timer configuring unit 204 may set a longer time length of the first timer according to the instruction received from the second node. On the other hand, in a case that there is a running or expired second timer, it may be instructed according to conditions such as the number of the second timers, load of the corresponding cells or the like that a shorter time length of the first timer may be set, and thus the timer configuring unit 204 may configure a shorter time length of the first timer according to the instruction so as to quickly solve the radio link problem through reconnection, handover or releasing connection.

Figure 3:
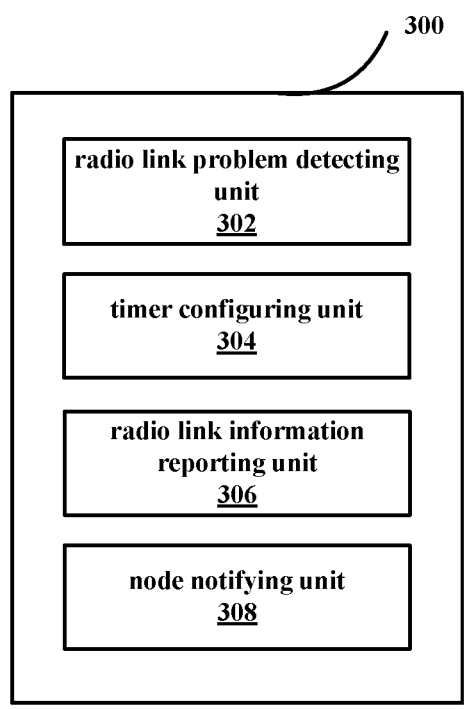
FIG. 3 is a block diagram illustrating an example of functional configuration of a device on user equipment side in a wireless communication system according to another embodiment of the disclosure.

An example of functional configuration of a device on user equipment side according to another embodiment of the disclosure will be described with reference to FIG. 3 below. FIG. 3 is a block diagram illustrating an example of functional configuration of a device on user equipment side according to another embodiment of the disclosure.

As shown in FIG. 3, a device 300 on user equipment side may include a radio link problem detecting unit 302, a timer configuring unit 304, a radio link information reporting unit 306 and a node notifying unit 308. Particularly, functional configurations of the radio link problem detecting unit 302, the timer configuring unit 304 and the radio link information reporting unit 306 are the same as those of the radio link problem detecting unit 102, the timer configuring unit 104 and the radio link information reporting unit 106 described above with reference to FIG. 1, and thus no repeated description will be made herein. Only an example of functional configuration of the node notifying unit 308 will be described in detail below.

The node notifying unit 308 may be configured to notify, if the user equipment is in a discontinuous reception sleeping state with respect to the second node when the radio link problem occurs in the first radio link, the second node that the user equipment recovers from the discontinuous reception sleeping state to realize transmission of the radio link information of the first radio link on the second radio link.

Specifically, a discontinuous reception (DRX) mechanism is generally used to save power consumption of the user equipment, and an important point thereof is to make an agreement regarding when to activate data reception and when to deactivate data reception between other nodes and the user equipment. Therefore, the user equipment may actively notify the nodes that it wishes to recover from DRX sleeping state through a relevant mechanism. Specifically, for example, when it has been detected a problem has occurred in the first radio link, the node notifying unit 308 may additionally add several bits in a resource scheduling signaling (SR) of a physical uplink control channel (PUCCH) to notify the second node that the radio link problem has occurred currently and the user equipment needs to recover from the DRX sleeping state. Thereafter, the user equipment enters a DRX activated state at an agreed n-th subframe, detects whether there is control information on a physical downlink control channel (PDCCH), and then completes transmission of the radio link information through the second radio link.

Further, it should understand that the above functional configuration of the device 300 is only an example but not limitation, and those skilled in the art may appropriately make modifications, for example, the device 300 may naturally further include the instruction receiving unit 208 and the connection controlling unit 210 described above with reference to FIG. 2.

Figure 4:
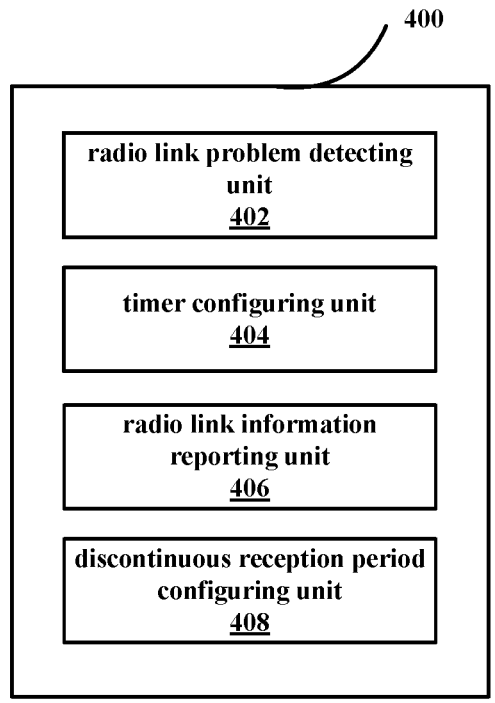
FIG. 4 is a block diagram illustrating an example of functional configuration of a device on user equipment side in a wireless communication system according to another embodiment of the disclosure.

FIG. 4 is a block diagram illustrating an example of functional configuration of a device on user equipment side according to another embodiment of the disclosure.

As shown in FIG. 4, a device 400 on user equipment side may include a radio link problem detecting unit 402, a timer configuring unit 404, a radio link information reporting unit 406 and a discontinuous reception period configuring unit 408. Particularly, functional configurations of the radio link problem detecting unit 402, the timer configuring unit 404 and the radio link information reporting unit 406 are the same as those of the radio link problem detecting unit 102, the timer configuring unit 104 and the radio link information reporting unit 106 described with reference to FIG. 1, and thus no repeated description will be made herein. Only an example of functional configuration of the discontinuous reception period configuring unit 408 will be described in detail below.

As described above, if the DRX mechanism is adopted between the user equipment and the second node, when it has been detected the problem has occurred on the first radio link, information transmission on the second radio link might be influenced, if the DRX period is set too long, or the user equipment has just finished the DRX sleeping state and thus time from next DRX activated state is too long (for example, an order of magnitude of several hundreds of milliseconds or a second).

The discontinuous reception period configuring unit 408 may be configured to configure, if a signal quality measured at the first node is lower than a predetermined threshold, a discontinuous reception period on the second radio link between the user equipment and the second node for the user equipment according to a time length of the first timer (for example, so that the DRX period is longer than or equal to the time length of the first timer), and/or to configure, if the first timer is running in a discontinuous reception activated state, a short discontinuous reception period on the second radio link between the user equipment and the second node for the user equipment.

Thus, it is possible to enable the user equipment to recover from the DRX sleeping state as soon as possible when it has been detected the problem has occurred on the first radio link, so as to transmit radio link information about the first radio link on the second radio link.

It should understand that the functional configuration of the device 400 as described above is only an example but not limitation, and those skilled in the art may appropriately make modifications, for example, the device 400 may naturally further include the instruction receiving unit 208, the connection controlling unit 210 and the node notifying unit 308 as described above.

According to the above embodiments, in the scene of dual-connection, when the radio link problem has occurred in one connection, by means of the other connection, it makes the user equipment perform corresponding operations to solve the radio link problem as soon as possible, thereby enabling reduction in the service interruption time of the user equipment and improvement in user experience.

It should be noted that the functional configurations of the device on user equipment side described above with reference to FIGS. 1-4 are only examples but not limitation, and those skilled in the art may make modifications, combinations and/or alternations according to the principle of the disclosure, and all of these variations should be considered as falling within the scope of the disclosure. Further, it should also be noted that the device on user equipment side described above may be located in the user equipment and may also be installed out of the user equipment, and the disclosure makes no limitation on this.

Figure 5:
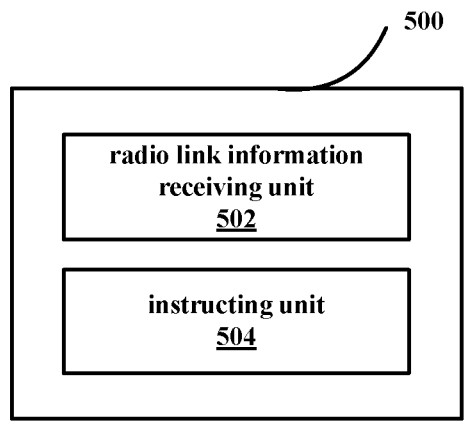
FIG. 5 is a block diagram illustrating an example of functional configuration of a device in a wireless communication system according to an embodiment of the disclosure.

Next, an example of functional configuration of a device in a wireless communication system according to an embodiment of the disclosure will be described with reference to FIG. 5. FIG. 5 is a block diagram illustrating an example of functional configuration of a device in a wireless communication system according to an embodiment of the disclosure.

As shown in FIG. 5, a device 500 may include a radio link information receiving unit 502 and an instructing unit 504.

The radio link information receiving unit 502 may be configured to receive, when the radio link problem occurs in the first radio link between the user equipment and the other node, a report of content containing radio link information of the first radio link from the user equipment. Particularly, the user equipment starts a first timer when it has been detected that the radio link problem has occurred in the first radio link and considers it has been detected that a radio link failure event has occurred in the first radio link when the first timer expires. Thereafter, the node corresponding to the device 500 may notify related information to the other node via the X2 interface for example.

Preferably, the reported content may include information related to the second timer of the user equipment, and when there is a cell satisfying a predetermined measurement reporting event, the user equipment starts the second timer for each satisfied measurement reporting event, and performs corresponding measurement reporting when the second timer expires. The measurement reporting event herein includes for example the above events A1 to A6 and events B1 and B2.

Further, preferably, the information related to the second timer may include a state of the second timer and information of the cell corresponding to the second timer, and the state of the second timer includes at least one of being running and having expired. The cell information may include for example the ID of the cell corresponding to the second timer. Further, preferably, information related to the second timer may further include information of corresponding measurement reporting events, such as types of the measurement reporting events or the like. The first/second node may know currently potential cells to which handover can be performed by combining with this information, and may assist the user equipment in quickly recovering from the radio link problem by combining with the network deployment information, the load information or the like. Alternatively, the information related to the second timer may also include only state information (for example, being running or having expired) of the second timer and number of the second timers in corresponding different states.

It should understand that the other node here corresponds to the above first node, and the node corresponding to the device 500 corresponds to the above second node.

The instructing unit 504 may be configured to instruct, according to the received report, the user equipment or the other node to perform corresponding operations to solve the radio link problem.

Specifically, the instructing unit 504 may instruct the user equipment to, when the first timer is paused or expires, perform reconnection with the other node, release connection with the other node and establish connection with other target nodes, or release connection with the other node so that the dual-connection is changed to the single connection, and may instruct the other node to deliver context information between the other node and the user equipment to corresponding target cells, so as to solve the radio link problem.

Further, preferably, the instructing unit 504 may send warning information for the radio link problem and the information related to the second timer to the other node, and thus the other node may prepare in advance related context information of the user equipment so as to be provided to the potential handover target cells. As such, it is possible to reduce the service interruption time of the user equipment, thereby obtaining better user experience.

Figure 6:
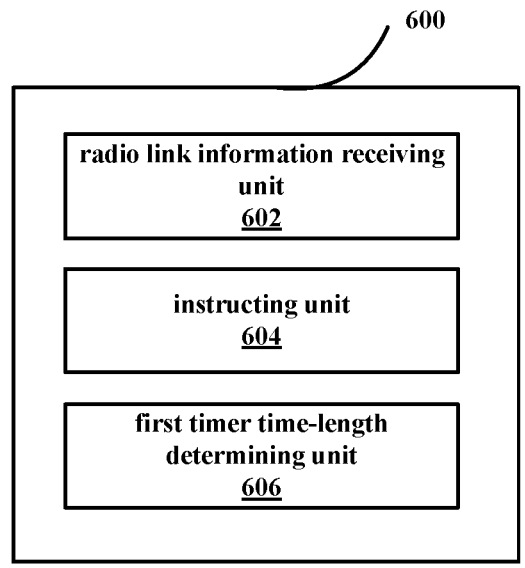
FIG. 6 is a block diagram illustrating an example of functional configuration of a device in a wireless communication system according to another embodiment of the disclosure.

An example of functional configuration of a device in a wireless communication system according to another embodiment of the disclosure will be described with reference to FIG. 6 below. FIG. 6 is a block diagram illustrating an example of functional configuration of a device in a wireless communication system according to another embodiment of the disclosure.

As shown in FIG. 6, a device 600 may include a radio link information receiving unit 602, an instructing unit 604 and a first timer time-length determining unit 606. Particularly, functional configurations of the radio link information receiving unit 602 and the instructing unit 604 are the same as those of the radio link information receiving unit 502 and the instructing unit 504 described with reference to FIG. 5, and thus no repeated description will be made herein. Only an example of functional configuration of the first timer time-length determining unit 606 will be described in detail below.

The first timer time-length determining unit 606 may be configured to determine a time length of the first timer of the user equipment according to the received report, and the instructing unit 604 may instruct the determined time length of the first timer to the user equipment.

Specifically, as described above, if the current radio link problem is judged as temporary, the first timer time-length determining unit 606 may determine a longer time length of the first timer to wait for recovering of the first radio link. On the contrary, if it is judged that there is a second timer of a corresponding measurement reporting event when the current radio link problem occurs, then it indicates that the condition of the first radio link is relatively poor, and thus the first timer time-length determining unit 606 may determine a shorter time length of the first timer to enable the user equipment to solve the radio link problem as soon as possible.

Figure 7:
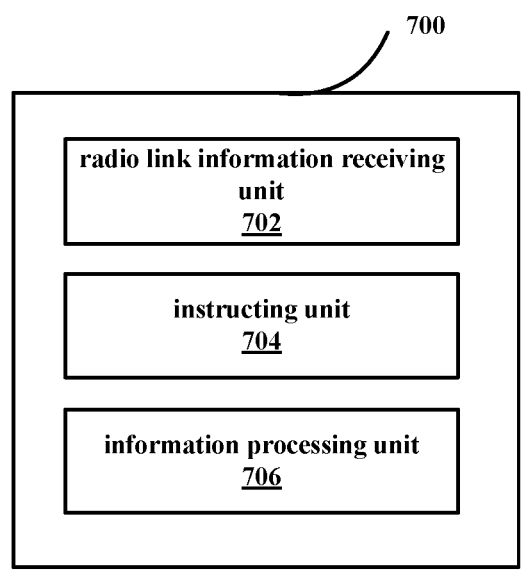
FIG. 7 is a block diagram illustrating an example of functional configuration of a device in a wireless communication system according to another embodiment of the disclosure.

FIG. 7 is a block diagram illustrating an example of functional configuration of a device in a wireless communication system according to another embodiment of the disclosure.

As shown in FIG. 7, a device 700 may include a radio link information receiving unit 702, an instructing unit 704 and an information processing unit 706. Particularly, functional configurations of the radio link information receiving unit 702 and the instructing unit 704 are the same as those of the radio link information receiving unit 502 and the instructing unit 504 described with reference to FIG. 5, and thus no repeated description will be made herein. Only an example of functional configuration of the information processing unit 706 will be described in detail below.

The information processing unit 706 may be configured to choose candidate cells having the same cell types as the other node from all of cells corresponding to the second timers and determine availability of each candidate cell, the cell types including a macro cell and a small cell. For example, if the cell type of the other node is the macro cell, then the chosen candidate cells should be only macro cells. On the other hand, if the cell type of the other node is the small cell, the chosen candidate cells should be only small cells. As an example, the information processing unit 706 may determine the availability of each cell according to a condition of service load thereof (for example, in a case that some cells have lighter service load and better overall communication quality, these cells can be determined as available).

Herein, it should be noted that preferably the information processing unit 706 may determine in priority availability of candidate cells corresponding to the second timers having expired, and if all the candidate cells corresponding to the second timers having expired are not available, the information processing unit 706 further determines availability of the candidate cells corresponding to the running second timers. Then, a processing result of the information processing unit 706 may be notified to the user equipment via the instructing unit 704.

Further, it should also be noted that preferably the information processing unit 706 determines the availability of the chosen cells, enabling the handover to be performed between the cells having the same types and reducing unnecessary availability detection, but the disclosure is not limited thereto. With the development of the technology, the information processing unit 706 may also determine the availability of the cells corresponding to all the second timers, thereby realizing handover between the cells of different types.

It may be understood that the processing performed by the information processing unit 706 is optional and some of the processes may also be performed on user equipment side, as described above. For example, in a case that the choosing processing is performed on the user equipment side, the information processing unit 706 may directly determine the availability of the candidate cells.

Further, it should understand that in the present specification, the purpose of determining the "availability" is to determine a better candidate among the cells to which the user equipment may perform handover, for example, a cell which has context information of the user equipment so that the user equipment may quickly perform connection therewith, a cell which has lighter load so that better service quality can be provided, or a cell which may also be determined based on various factors, the invention makes no limitation on this.

Figure 8:
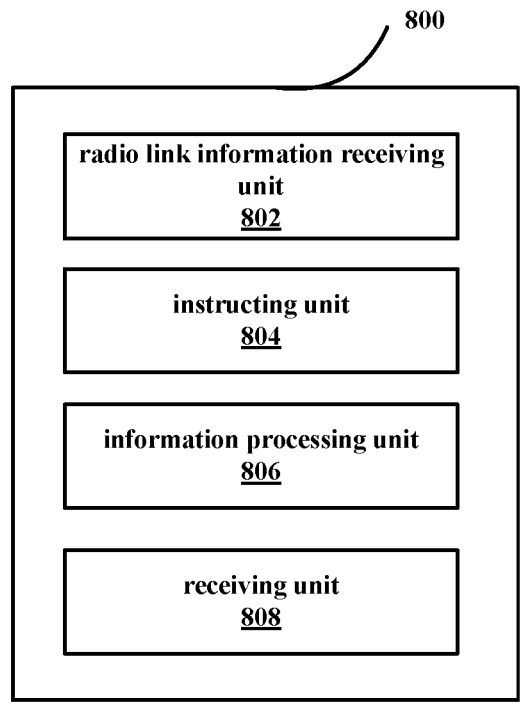
FIG. 8 is a block diagram illustrating an example of functional configuration of a device in a wireless communication system according to another embodiment of the disclosure.

FIG. 8 is a block diagram illustrating an example of functional configuration of a device in a wireless communication system according to another embodiment of the disclosure.

As shown in FIG. 8, a device 800 may include a radio link information receiving unit 802, an instructing unit 804, an information processing unit 806 and a receiving unit 808. Particularly, functional configurations of the radio link information receiving unit 802, the instructing unit 804 and the information processing unit 806 are the same as those of the radio link information receiving unit 702, the instructing unit 704 and the information processing unit 706 described with reference to FIG. 7, and thus no repeated description will be made herein. Only an example of functional configuration of the receiving unit 808 will be described in detail below.

The receiving unit 808 may be configured to receive from the other node information indicating which candidate cells have context information between the other node and the user equipment.

Preferably, the information processing unit 806 may further determine the availability of each candidate cell according to the information received by the receiving unit 808 and determine control information for the first timer, which may include pausing or maintaining running of the first timer, according to conditions of the candidate cells, and the instructing unit 804 may instruct information on the availability of each candidate cell and the control information for the first timer to the user equipment.

Specifically, if the information processing unit 806 determines the chosen candidate cell is none, it is determined that the running of the first timer is maintained, and the instructing unit 804 instructs the user equipment not to change the first timer and to perform reconnection with the other node when the first timer expires.

On the other hand, if the information processing unit 806 determines the number of the candidate cells is larger than a predetermined threshold, it is determined that the running of the first timer is maintained, and the instructing unit 804 instructs the user equipment not to change the first timer and to release the connection with the other node when the first timer expires and transfer the service carried by the first radio link to the node corresponding to the device 800, thus, the dual-connection is changed to the single connection.

Further, if the information processing unit 806 determines these candidate cells as unavailable according to the information received by the receiving unit 808 (for example, information related to candidate cells having context information of the user equipment), it is determined that the running of the first timer is maintained, and the instructing unit 804 instructs the user equipment not to change the first timer and to release the connection with the other node when the first timer expires and transfer the service carried by the first radio link to the node corresponding to the device 800, thereby making the dual-connection become the single connection.

On the contrary, if the information processing unit 806 determines there is an available candidate cell according to the information received by the receiving unit 808, it is determined that the running of the first timer is paused, and the instructing unit 804 instructs the user equipment to immediately pause the first timer when the second timer corresponding to the available candidate cell expires and to release the connection with the other node and establish connection with a target node corresponding to the available candidate cell.

Further, preferably, in a case that the information processing unit 806 determines maintaining the running of the first timer, the instructing unit 804 further instructs to the user equipment the reason why the running of the first timer is maintained, that is, the candidate cell being none, the number of the candidate cells being larger than the predetermined threshold or all the candidate cells being unavailable.

Further, when the first radio link mainly carries control signaling transmission, that is, when the other node in which the radio link problem occurs is the anchor node taking charge of the control plane, before the user equipment releases the connection with the other node and attempts to establish the connection with the target node, it needs to first establish a connection on the control plane between the node corresponding to the device 800 and the user equipment, so that the second radio link between the node corresponding to the device 800 and the user equipment mainly carries the control signaling transmission.

It should be understood that the anchor node takes charge of the control plane, and thus shall perform relevant judging operations, that is to say, when the radio link problem occurs, whether to perform changeover of the anchor node shall be judged by the anchor node. Specifically, when it has been detected at the other node serving as the anchor node the radio link problem has occurred, the node corresponding to the device 800 sends to the other node warning information about the radio link problem and information of the target cell to which handover may be performed, and the other node judges whether it needs to perform changeover of the anchor node according to actual conditions, sends a judging result to the node corresponding to the device 800, and delivers the context information of the user equipment to corresponding handover target node according to the judging result, so that the node corresponding to the device 800 instructs the user equipment to perform corresponding operations to solve the radio link problem.

Specifically, if the judging result indicates only changeover of anchor node/booster node, the instructing unit 804 of the device 800 may instruct the user equipment to release connection between the user equipment and the other node and to establish the connection on the control plane with the node corresponding to the device 800, thereby completing changeover of the anchor node/booster node. On the other hand, if the judging result is to instruct the booster node to assist completion of changeover of the anchor node, the instructing unit 804 of the device 800 may instruct the user equipment to immediately release the connection with the other node when the second timer corresponding to the handover target cell expires, establish the connection on the control plane with the node corresponding to the device 800 so as to complete the changeover of the anchor node/booster node, and synchronize with the handover target cell to establish the connection on the user plane after completion of the changeover. Thereafter, if the link between the user equipment and the handover target cell is relatively stable within a predetermined time, the changeover of the anchor node/booster node is performed again, that is, the handover target cell takes charge of the control plane and the node corresponding to the device 800 takes charge of the user plane.

It should be understood that the functional configurations of the device in the wireless communication system according to the embodiments of the disclosure described above with reference to FIGS. 5-8 are only examples but not limitations, and those skilled in the art may make modifications, combinations and/or alternations according to the principle of the disclosure, and all of these variations should be considered as falling within the scope of the disclosure. Further, it should be noted that the above described device may be located in the node corresponding to the device and may also be installed out of the node, the disclosure makes no limitation on this.

Figure 9:
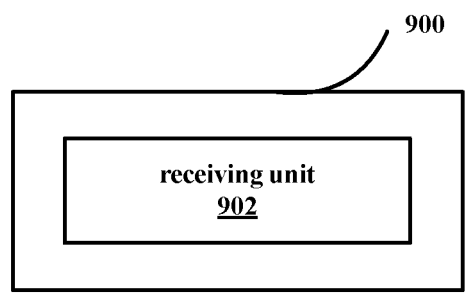
FIG. 9 is a block diagram illustrating an example of functional configuration of a device in a wireless communication system according to an embodiment of the disclosure.

Hereinafter, an example of functional configuration of a device in a wireless communication system according to an embodiment of the disclosure will be described with reference to FIG. 9. FIG. 9 is a block diagram illustrating an example of functional configuration of a device in a wireless communication system according to an embodiment of the disclosure.

As shown in FIG. 9, a device 900 may include a receiving unit 902.

The receiving unit 902 may be configured to receive, when the radio link problem occurs in a first radio link between a node corresponding to the device 900 and the user equipment, a warning about the radio link problem from the other node, so that the device 900 takes corresponding measures to solve the radio link problem according to the warning.

It should be understood that the node corresponding to the device 900 herein corresponds to the above first node, and the other node corresponds to the above second node. Specifically, the node corresponding to the device 900 may for example prepare in advance, according to the warning received from the other node, the context information between the user equipment and the node so as to be provided to the handover target cell, thereby facilitating reduction in the service interruption time of the user equipment.

Figure 10:
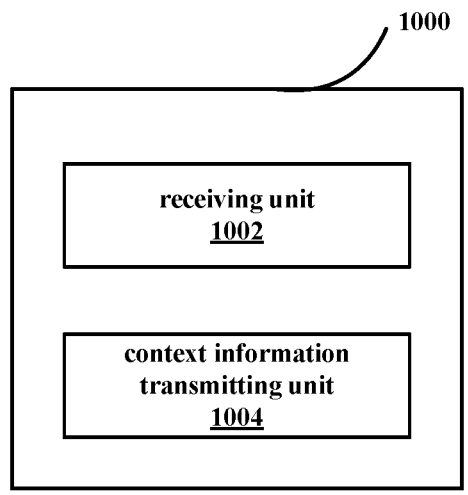
FIG. 10 is a block diagram illustrating an example of functional configuration of a device in a wireless communication system according to another embodiment of the disclosure.

FIG. 10 is a block diagram illustrating an example of functional configuration of a device in a wireless communication system according to another embodiment of the disclosure.

As shown in FIG. 10, a device 1000 includes a receiving unit 1002 and a context information transmitting unit 1004.

In addition to the warning about the radio link problem from the other node, the receiving unit 1002 may further receive information related to the second timer of the user equipment from the other node. When there is a cell satisfying a predetermined measurement reporting event, the user equipment starts the second timer for each satisfied measurement reporting event, and performs corresponding measurement reporting when the second timer expires.

The context information transmitting unit 1004 may be configured to transmit to a cell corresponding to the second timer context information between the node corresponding to the device 1000 and the user equipment and to inform the other node of which cells have the context information of the user equipment. Thus, the other node may instruct, according to this information, the user equipment to perform corresponding operations to solve the radio link problem as soon as possible.

Figure 11:
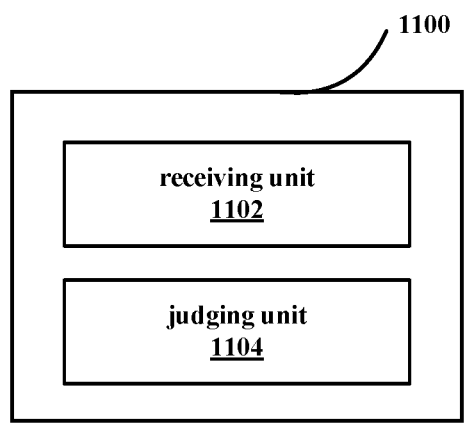
FIG. 11 is a block diagram illustrating an example of functional configuration of a device in a wireless communication system according to another embodiment of the disclosure.

FIG. 11 is block diagram illustrating an example of functional configuration of a device in a wireless communication system according to another embodiment of the disclosure.

As shown in FIG. 11, a device 1100 includes a receiving unit 1102 and a judging unit 1104. Particularly, functional configuration of the receiving unit 1102 is the same as those of the receiving unit described above with reference to FIGS. 9 and 10, and thus no repeated description will be made herein. Only an example of functional configuration of the judging unit 1104 will be described in detail below.

The judging unit 1104 may be configured to judge, when the first radio link mainly carries control signaling transmission, whether an operation of reconnecting, handover or releasing connection is performed for the node corresponding to the device 1100, so as to inform the other node, and thus the other node instructs the user equipment to perform corresponding operations to solve the radio link problem.

Specifically, as described above, when the radio link problem is detected at the anchor node, the anchor node needs to perform judging for relevant operations and inform the booster node via the X2 interface, so that the booster node instructs the user equipment to perform corresponding operations to solve the radio link problem.

Figure 12:
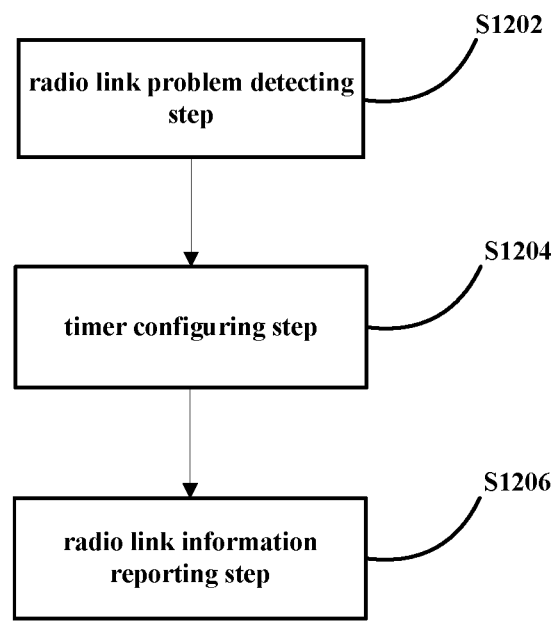
FIG. 12 is a flow chart illustrating an example of a procedure of a method for use in a wireless communication system according to an embodiment of the disclosure.

It should be understood that the functional configurations of the device in the wireless communication system according to the embodiments of the disclosure described above with reference to FIGS. 9-11 are only examples but not limitations, and those skilled in the art may make modifications, combinations and/or alternations according to the principle of the disclosure, and all of these variations should be considered as falling within the scope of the disclosure. Further, it should also be noted that the above described device may be located in the node corresponding to the device and may also be installed out of the node, the disclosure makes no limitation on this.

FIG. 12 is a flow chart illustrating an example of a procedure of a method for use in a wireless communication system according to an embodiment of the disclosure.

As shown in FIG. 12, first, in a radio link problem detecting step S1202, a first radio link between a first node and user equipment is detected to determine whether a radio link problem occurs.

Next, in a timer configuring step S1204, a first timer is started when it has been detected the radio link problem has occurred in the first radio link, and the user equipment considers it has been detected a radio link failure event has occurred in the first radio link when the first timer expires.

Then, in a radio link information reporting step S1206, when it has been detected the radio link problem has occurred in the first radio link, content containing the radio link information of the first radio link is reported to the second node via the second radio link between the user equipment and the second node.

In this way, by reporting the information regarding the radio link problem to the second node, the second node may send the warning to the first node via for example the X2 interface to notify occurrence of the radio link problem, thus, the first node may for example prepare in advance the context information of the user equipment so as to be provided to a potential handover target cell, thereby facilitating reduction in the service interruption time of the user equipment to some extent.

It should be noted that the method for use in the wireless communication system described herein is a method embodiment corresponding to the device on user equipment side described above with reference to FIGS. 1-4, and thus the contents which are not described in detail herein may be referred to the descriptions at corresponding positions in the above device embodiments, no repeated description will be made herein.

Figure 13:
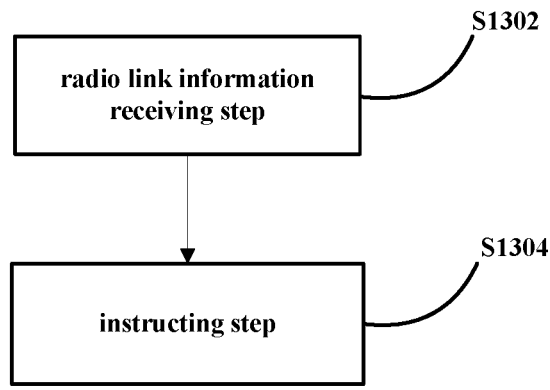
FIG. 13 is a flow chart illustrating an example of a procedure of a method for use in a wireless communication system according to an embodiment of the disclosure.

FIG. 13 is a flow chart illustrating an example of a procedure of a method for use in a wireless communication system according to an embodiment of the disclosure.

As shown in FIG. 13, first, in a radio link information receiving step S1302, when the radio link problem occurs in the first radio link between the user equipment and the first node, a report of content containing the radio link information of the first radio link is received from the user equipment, where the user equipment starts the first timer when it has been detected the radio link problem has occurred in the first radio link, and considers it has been detected the radio link failure event has occurred in the first radio link when the first timer expires.

Next, in an instructing step S1304, according to the received report, the user equipment or the first node is instructed to perform corresponding operations to solve the radio link problem.

It should be noted that the method for use in the wireless communication system described herein is a method embodiment corresponding to the device in the wireless communication system described above with reference to FIGS. 5-8, and thus the contents which are not described in detail herein may be referred to the descriptions at corresponding positions in the above device embodiments, no repeated description will be made herein.

Figure 14:
FIG. 14 is a flow chart illustrating an example of a procedure of a method for use in a wireless communication system according to an embodiment of the disclosure.

FIG. 14 is a flow chart illustrating an example of a procedure of a method for use in a wireless communication system according to an embodiment of the disclosure.

As shown in FIG. 14, in a receiving step S1402, when the radio link problem occurs in the first radio link between the first node and the user equipment, a warning about the radio link problem is received from a second node, so that the first node takes corresponding measures to solve the radio link problem according to the warning.

It should be noted that the method for use in the wireless communication system described herein is a method embodiment corresponding to the device in the wireless communication system described above with reference to FIGS. 9-11, and thus the contents which are not described in detail herein may be referred to the descriptions at corresponding positions in the above device embodiments, no repeated description will be made herein.

Figure 15:
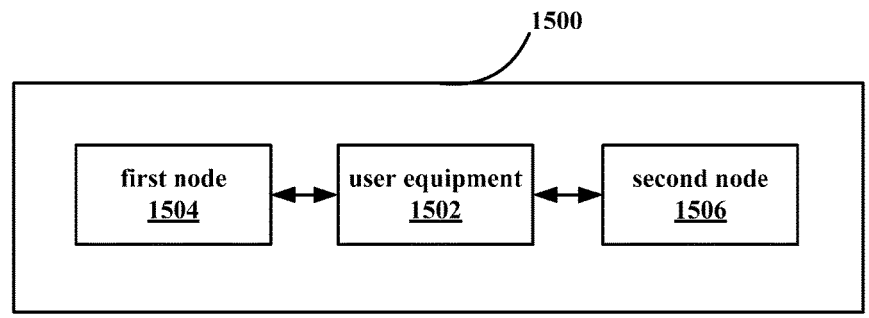
FIG. 15 is a block diagram illustrating an example of configuration of a wireless communication system according to an embodiment of the disclosure.

FIG. 15 is a block diagram illustrating configuration of a wireless communication system according to an embodiment of the disclosure.

As shown in FIG. 15, a wireless communication system 1500 may include user equipment 1502, a first node 1504 and a second node 1506. Particularly, the user equipment 1502, the first node 1504 and the second node 1506 may include the device on user equipment side and the device on node side described above respectively, or may realize the corresponding methods for use in the wireless communication system described above, and the specific contents may be referred to the foregoing descriptions at corresponding positions, no repeated description will be made herein.

Preferably, when the radio link problem occurs in the first radio link between the user equipment and the first node, the user equipment may report the content containing the radio link information of the first radio link to the second node via the second radio link between the user equipment and the second node, so that the second node instructs the user equipment or the first node to perform corresponding operations to solve the radio link problem.

According to the above description of the embodiments of the invention, in the scene of dual-connection, the radio link problem occurring in the other radio link may be solved by means of a radio link in better condition, thereby facilitating reduction in the service interruption time of the user equipment and improvement in user experience.

Further, an embodiment of the disclosure also provides an electronic apparatus which is located on user equipment side in the wireless communication system and includes a circuit configured to perform: detecting a first radio link between a first node and user equipment so as to determine whether a radio link problem has occurred; starting a first timer when it is detected that the radio link problem has occurred in the first radio link, in which when the first timer expires, the user equipment considers it has been detected that a radio link failure event has occurred in the first radio link; and reporting, when it has been detected that the radio link problem has occurred in the first radio link, content containing radio link information of the first radio link to a second node via a second radio link between the user equipment and the second node.

Further, an embodiment of the disclosure also provides an electronic apparatus which is located in the wireless communication system and includes a circuit configured to perform: receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and instructing, according to the received report, the user equipment or the first node to perform corresponding operations to solve the radio link problem.

Further, an embodiment of the disclosure also provides an electronic apparatus which is located in the wireless communication system and includes a circuit configured to perform: receiving, when a radio link problem occurs in a first radio link between a first node and user equipment, a warning about the radio link problem from a second node, so that the first node takes corresponding measures to solve the radio link problem according to the warning.

Further, an embodiment of the disclosure also provides a storage medium including machine readable program codes which, when executed on an information processing apparatus, cause the information processing apparatus to perform the following steps: a radio link problem detecting step of detecting a first radio link between a first node and user equipment so as to determine whether a radio link problem has occurred; a timer configuring step of starting a first timer when it is detected that the radio link problem has occurred in the first radio link, in which when the first timer expires, the user equipment considers it has been detected that a radio link failure event has occurred in the first radio link; and a radio link information reporting step of reporting, when it has been detected that the radio link problem has occurred in the first radio link, content containing radio link information of the first radio link to a second node via a second radio link between the user equipment and the second node.

Further, an embodiment of the disclosure also provides a program product including machine executable instructions which, when executed on an information processing apparatus, cause the information processing apparatus to perform the following steps: a radio link problem detecting step of detecting a first radio link between a first node and user equipment so as to determine whether a radio link problem has occurred; a timer configuring step of starting a first timer when it is detected that the radio link problem has occurred in the first radio link, in which when the first timer expires, the user equipment considers it has been detected that a radio link failure event has occurred in the first radio link; and a radio link information reporting step of reporting, when it has been detected that the radio link problem has occurred in the first radio link, content containing radio link information of the first radio link to a second node via a second radio link between the user equipment and the second node.

Further, an embodiment of the disclosure also provides a storage medium including machine readable program codes which, when executed on an information processing apparatus, cause the information processing apparatus to perform the following steps: a radio link information receiving step of receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing step of instructing, according to the received report, the user equipment or the first node to perform corresponding operations to solve the radio link problem.

Further, an embodiment of the disclosure also provides a program product including machine executable instructions which, when executed on an information processing apparatus, cause the information processing apparatus to perform the following steps: a radio link information receiving step of receiving, when a radio link problem occurs in a first radio link between user equipment and a first node, a report of content containing radio link information of the first radio link from the user equipment, in which the user equipment starts a first timer when it has been detected that the radio link problem has occurred in the first radio link and considers it has been detected that a radio link failure event has occurred in the first radio link when the first timer expires; and an instructing step of instructing, according to the received report, the user equipment or the first node to perform corresponding operations to solve the radio link problem.

Further, an embodiment of the disclosure also provides a storage medium including machine readable program codes which, when executed on an information processing apparatus, cause the information processing apparatus to perform the following steps: a receiving step of receiving, when a radio link problem occurs in a first radio link between a first node and user equipment, a warning about the radio link problem from a second node, so that the first node takes corresponding measures to solve the radio link problem according to the warning.

Further, an embodiment of the disclosure also provides a program product including machine executable instructions which, when executed on an information processing apparatus, cause the information processing apparatus to perform the following steps: a receiving step of receiving, when a radio link problem occurs in a first radio link between a first node and user equipment, a warning about the radio link problem from a second node, so that the first node takes corresponding measures to solve the radio link problem according to the warning.

It should be understood that the electronic apparatus and the machine executable instructions in the storage medium and the program product according to the embodiments of the disclosure may also be configured to perform the methods corresponding to the above device embodiments, and thus the contents which are not described in detail herein may be referred to the foregoing descriptions at corresponding positions, no repeated description will be made herein.

Accordingly, a storage medium on which the above program product storing machine readable instructions is carried is also included in the disclosure of the invention. The storage medium includes but is not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1600 illustrated in FIG. 16, which can perform various functions when various programs are installed thereon.

Figure 16:
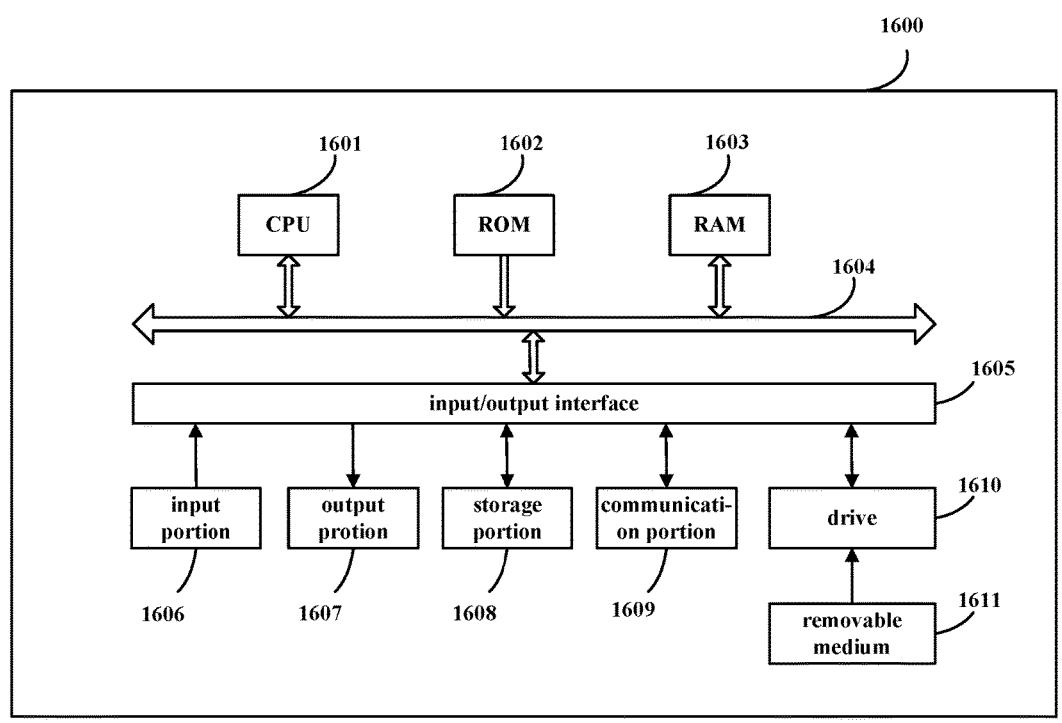
FIG. 16 is a block diagram illustrating an exemplary structure of a personal computer as an information processing apparatus that may be used in an embodiment of the disclosure.

In FIG. 16, a Central Processing Unit (CPU) 1601 performs various processes according to a program stored in a Read Only Memory (ROM) 1602 or loaded from a storage portion 1608 into a Random Access Memory (RAM) 1603 in which data required when the CPU 1601 performs the various processes is also stored as needed.

The CPU 1601, the ROM 1602 and the RAM 1603 are connected to each other via a bus 1604 to which an input/output interface 1605 is also connected.

The following components are connected to the input/output interface 1605: an input portion 1606 including a keyboard, a mouse, etc.; an output portion 1607 including a display, e.g., a Cathode Ray Tube (CRT), a Liquid Crystal Display (LCD), etc., a speaker, etc.; a storage portion 1608 including a hard disk, etc.; and a communication portion 1609 including a network interface card, e.g., an LAN card, a modem, etc. The communication portion 1609 performs a communication process over a network, e.g., the Internet.

A drive 1610 is also connected to the input/output interface 1605 as needed. A removable medium 1611, e.g., a magnetic disk, an optical disk, a magneto optical disk, a semiconductor memory, etc., can be installed on the drive 1610 as needed so that a computer program fetched therefrom can be installed into the storage portion 1608 as needed.

In the case that the foregoing series of processes are performed in software, a program constituting the software is installed from a network, e.g., the Internet, etc., or a storage medium, e.g., the removable medium 1611, etc.

Those skilled in the art shall appreciate that such a storage medium will not be limited to the removable medium 1611 illustrated in FIG. 16 in which the program is stored and which is distributed separately from the apparatus to provide a user with the program. Examples of the removable medium 1611 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1602, a hard disk included in the storage portion 1608, etc., in which the program is stored and which is distributed together with the apparatus including the same to the user.

It shall further be noted that the steps of the foregoing series of processes may naturally but not necessarily be performed in the sequential order as described chronically. Some of the steps may be performed concurrently or separately from each other.

Although the disclosure and the advantages thereof have been described in details, it shall be appreciated that various modifications, substitutions and variations can be made without departing from the spirit and scope of the disclosure as defined by the appended claims. Furthermore the terms "include", "comprise" or any variants thereof in the embodiments of the disclosure are intended to encompass nonexclusive inclusion so that a procedure, method, article or apparatus including a series of elements includes both those elements and one or more other elements which are listed explicitly or an element(s) inherent to the process, method, article or device. Without much more limitation, an element being defined by a sentence "include/comprise a(n) . . . " will not exclude presence of an additional identical element(s) in the procedure, method, article or device including the element.

The invention claimed is:

1. A user equipment device in a wireless communication system, the user equipment device comprising:
   circuitry configured to:
      establish a first radio link and a second radio link, the first radio link being between the user equipment and a first node, and the second radio link being between the user equipment and a second node, so that the user equipment is simultaneously communicatively connected with the first node and the second node using the first radio link and the second radio link respectively;
      after establishing the first radio link and the second radio link, determine whether a radio link problem has occurred in the first radio link;
      start a first timer when it has been detected that the radio link problem has occurred in the first radio link, wherein when the first timer expires, the user equipment considers it has been detected that a radio link failure event has occurred in the first radio link; and
      report, when it has been detected that the radio link problem has occurred in the first radio link, content comprising radio link information of the first radio link to the second node via the second radio link between the user equipment and the second node, the radio link information comprising radio link failure type.

2. The user equipment device according to claim 1, wherein the radio link failure type comprises information indicating an expiry of the first timer.

3. The user equipment device according to claim 1, wherein the content reported to the second node comprises information related to a second timer of the user equipment, wherein when there is a cell satisfying a predetermined measurement reporting event, the user equipment starts the second timer for each satisfied measurement reporting event, and performs corresponding measurement reporting when the second timer expires.

4. The user equipment device according to claim 3, wherein the information related to the second timer comprises state of the second timer and information of a corresponding cell, and wherein the state of the second timer comprises at least one of being running and having expired.

5. The user equipment device according to claim 1, wherein the circuitry is further configured to:
   receive from the second node an instruction regarding the first radio link; and
   cause, according to the instruction, the user equipment to perform corresponding operations to solve the radio link problem.

6. The user equipment device according to claim 5, wherein the circuitry is further configured to adjust a time length of the first timer according to the instruction.

7. The user equipment device according to claim 3, wherein the circuitry is further configured to start a third timer simultaneously when it has been detected that the radio link problem has occurred in the first radio link, wherein the circuitry is further configured to report the content to the second node when the third timer expires, a time length of the third timer being shorter than a time length of the first timer.

8. The user equipment device according to claim 7, wherein when the third timer expires, the circuitry is further configured to reset the third timer and re-triggers the reset third timer, and the content is reported to the second node when the third timer expires, until the first timer expires or is paused.

9. The user equipment device according to claim 3, wherein the circuitry is further configured to choose candidate cells having the same cell types as the first node from all of cells corresponding to second timers, and reports information related to the second timers corresponding to the candidate cells to the second node, the cell types comprising a macro cell and a small cell.

10. The user equipment device according to claim 9, wherein the circuitry is further configured to judge whether number of the candidate cells is larger than a predetermined threshold, and does not report the content to the second node if it is judged that the number of the candidate cells is larger than the predetermined threshold.

11. The user equipment device according to claim 5, wherein the instruction further comprises availability information of cells corresponding to second timers and control information for the first timer, and the circuitry is further configured to perform processing of pausing or maintaining running of the first timer according to the control information for the first timer.

12. The user equipment device according to claim 11, wherein the availability information of the cells corresponding to the second timers comprises information indicating which cells have context information between the user equipment and the first node.

13. The user equipment device according to claim 11, wherein the circuitry is further configured to cause, according to the availability information of the cells corresponding to the second timers, the user equipment to release connection with the first node and attempt to establish connection with an available target cell among the cells corresponding to the second timers, or to release the connection with the first node and cause service carried by the first radio link to be transferred to the second radio link, after the first timer is paused.

14. The user equipment device according to claim 11, wherein when the control information for the first timer indicates maintaining the running of the first timer, the instruction further comprises a reason why the running is maintained or an instruction to perform reconnection or to release connection after the first timer expires.

15. The user equipment device according to claim 14, wherein when the first timer expires, the circuitry is further configured to cause the user equipment to reconnect to the first node or release connection with the first node according to the instruction, and in a case that the connection with the first node is released, the circuitry is further configured to cause the service carried by the first radio link to be transferred to the second radio link.

16. The user equipment device according to claim 13, wherein when the first radio link mainly carries control signaling transmission, the circuitry is further configured to cause, before causing the user equipment to release the connection with the first node and attempt to establish connection with the target cell, the user equipment to establish a connection on a control plane with the second node so that the second radio link mainly carries the control signaling transmission.

17. The user equipment device according to claim 1, wherein the circuitry is further configured to:
notify, if the user equipment is in a discontinuous reception sleeping state with respect to the second node when the radio link problem occurs in the first radio link, the second node that the user equipment recovers from the discontinuous reception sleeping state to realize transmission of the radio link information of the first radio link on the second radio link.

18. The user equipment device according to claim 1, wherein the circuitry is further configured to:
configure, if signal quality measured at the first node is lower than a predetermined threshold, a discontinuous reception period on the second radio link between the user equipment and the second node for the user equipment according to a time length of the first timer, and/or to configure, if the first timer is running in a discontinuous reception activated state, a short discontinuous reception period on the second radio link between the user equipment and the second node for the user equipment.

19. The user equipment device according to claim 1, wherein at least one of the first node and the second node is a base station.

20. The user equipment device according to claim 1, wherein the second node is an anchor node, and the first node is a booster node.

21. The user equipment device according to claim 1, wherein the first node and the second node have different transmission power and coverage area.

22. The user equipment device according to claim 21, wherein the second node has a larger transmission power than the first node, and the second node provides lager coverage area than the first node.

23. The user equipment device according to claim 1, wherein the second node is configured to carry control signaling.

24. A device in a wireless communication system, the device comprising:
circuitry configured to:
establish a second radio link between a node corresponding to the device and a user equipment, the user equipment also establishing a first radio link between the user equipment and other node so that the user equipment is simultaneously communicatively connected with the node and the other node using the second radio link and the first radio link respectively;
receive, when a radio link problem occurs in the first radio link between the user equipment and the other node after the first radio link and the second radio link are established, a report of content comprising radio link information of the first radio link from the user equipment, the radio link information comprising radio link failure type, wherein the user equipment starts a first timer when it has been detected that the radio link problem has occurred in the first radio link, and considers it has been detected that a radio link failure event has occurred in the first radio link when the first timer expires; and
instruct, according to the received report, the user equipment or the other node to perform corresponding operations to solve the radio link problem.

25. A device in a wireless communication system, the device comprising:
circuitry configured to:
control establishing a first radio link between a node corresponding to the device and a user equipment, the user equipment also establishing a second radio link between the user equipment and other node so that the user equipment is simultaneously communicatively connected with the node and the other node using the first radio link and the second radio link respectively; and
receive, when a radio link problem occurs in the first radio link between the node corresponding to the device and the user equipment after the first radio link and the second radio link are established, a warning about the radio link problem from the other node, so that the device takes corresponding measures to solve the radio link problem according to the warning, the warning comprising radio link failure type.

* * * * *